L. LANDEKER.
SECURING HANDLES IN TOOLS.

No. 194,358. Patented Aug. 21, 1877.

WITNESSES:
E. Wolff.
J. H. Scarborough.

INVENTOR:
L. Landeker.
BY
ATTORNEYS.

UNITED STATES PATENT OFFICE.

LAZARE LANDEKER, OF SAN LUIS OBISPO, CALIFORNIA.

IMPROVEMENT IN SECURING HANDLES IN TOOLS.

Specification forming part of Letters Patent No. 194,358, dated August 21, 1877; application filed June 18, 1877.

*To all whom it may concern:*

Figure 1:
Figure 2:
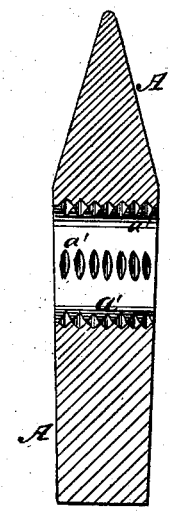

Be it known that I, LAZARE LANDEKER, of San Luis Obispo, in the county of San Luis Obispo and State of California, have invented a new and useful Improvement in Securing Handles to Tools, of which the following is a specification:

Figure 1 is a view of a hammer-head to which my improvement has been applied, part being broken away to show the construction. Fig. 2 is a section of the same, taken through the line $x$ $x$, Fig. 1.

Similar letters of reference indicate corresponding parts.

The object of this invention is furnish an improvement in securing handles in hammer-heads, and in all other tools in which the handles are inserted in eyes, by means of which the handles will be held firmly and securely in place.

The invention consists in the teeth, points, or other projections formed upon the surface of the eye of a tool, to be forced into the handle as it is spread by the wedges, for securing said handles immovably in said eye, as hereinafter fully described.

A represents the tool, in the surface of the eye of which are formed teeth, points, or other projections, $a'$, which, when the handle is inserted and wedged into said eye, will be forced into the wood of said handle, so that the handle cannot be withdrawn without tearing away the wood. The projections $a'$ also prevent the handle from turning in a round eye, and hold it immovably in place.

This device is also very convenient in use, as it requires no special preparation of the handle beyond bringing it to the shape of the eye and reducing it to such a size that it may be inserted past the said projections.

I am aware that it is not new to provide the handle of a tool with a screw-threaded ferrule; but

What I claim is—

A tool having the projections $a'$ on the inside of the eye thereof, as and for the purpose specified.

LAZARE LANDEKER.

Witnesses:
D. MALLAGH,
JULIUS KREBS.